United States Patent [19]
Gillemot et al.

[11] 3,827,704
[45] Aug. 6, 1974

[54] SEALING GROMMET AND PLUG FOR USE WITH ELECTRICAL CABLING

[76] Inventors: George W. Gillemot, 2331 20th St., Santa Monica, Calif. 90405; John T. Thompson, 244 Loring St., Los Angeles, Calif. 90024

[22] Filed: May 23, 1973

[21] Appl. No.: 363,075

Related U.S. Application Data
[62] Division of Ser. No. 263,551, June 16, 1972.

[52] U.S. Cl............. 277/209, 277/4, 174/93, 174/65 G
[51] Int. Cl............. F16j 9/00, H02g 15/18
[58] Field of Search............ 277/9, 209, 4; 174/93, 174/65 G, 152 G, 153 G

[56] References Cited
UNITED STATES PATENTS

| | | | |
|---|---|---|---|
| 2,517,717 | 8/1950 | Rose | 277/4 X |
| 2,896,974 | 7/1959 | Bush | 277/209 X |
| 3,254,153 | 5/1966 | Kohler | 174/93 |
| 3,458,649 | 7/1969 | Channell | 174/93 |
| 3,705,950 | 12/1972 | Jirka et al. | 174/93 X |

FOREIGN PATENTS OR APPLICATIONS

| | | | |
|---|---|---|---|
| 396,135 | 1/1966 | Switzerland | 174/65 G |
| 1,111,696 | 7/1961 | Germany | 174/153 G |
| 1,202,365 | 10/1965 | Germany | 174/153 G |

*Primary Examiner*—Samuel B. Rothberg
*Attorney, Agent, or Firm*—Sellers & Brace

[57] ABSTRACT

A sealing grommet and detachable plug for use in providing a fluid-tight seal between an electrical cable and the wall of a housing or the like. The grommets are formed of soft elastomeric material having outwardly projecting flexible ribs adapted to have sealing engagement with an opening seating the grommet. One or more passages through the grommet are appropriately sized to accommodate a cable and preferably include inwardly projecting flexible sealing ribs. The grommet is preferably slit lengthwise of one side to permit assembly of the grommet about a cable from the side of the cable. Cables of different size are accommodated by providing a set of concentric grommets which internest and one or more of which may be detached as necessary to provide a snug seal for a particular size cable. When a cable is not present the smallest grommet of the assembly is closed by a solid plug.

13 Claims, 8 Drawing Figures

PATENTED AUG 6 1974 3,827,704
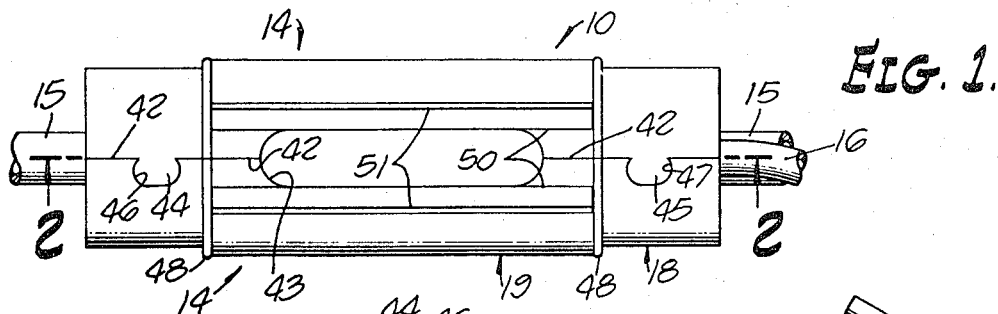
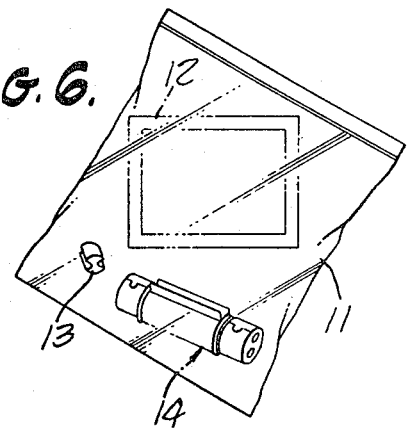
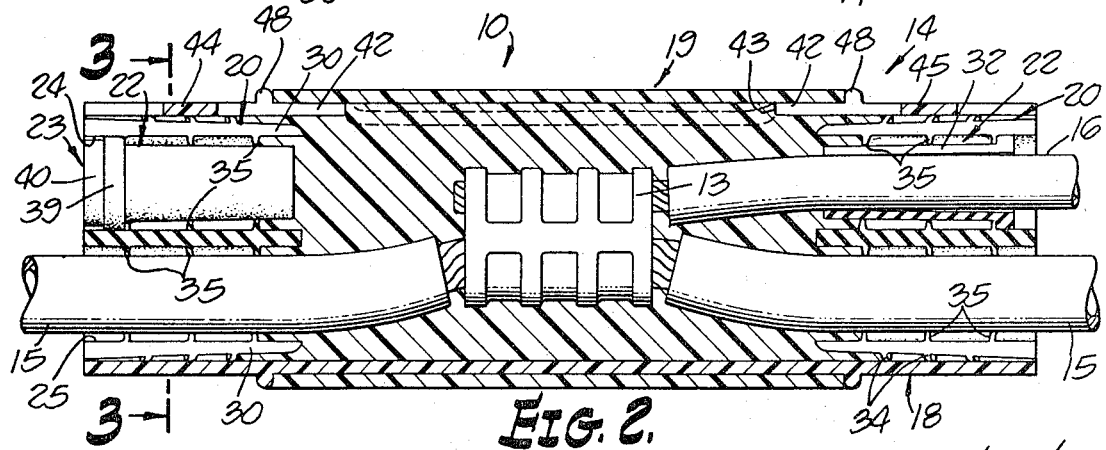
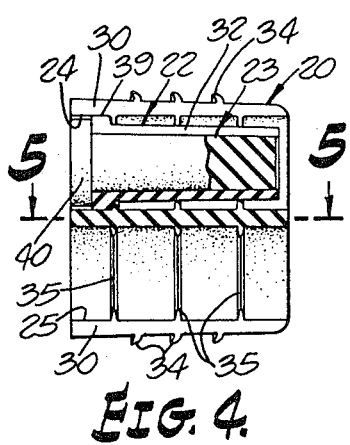
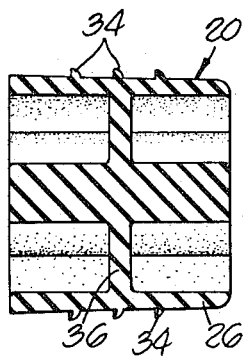
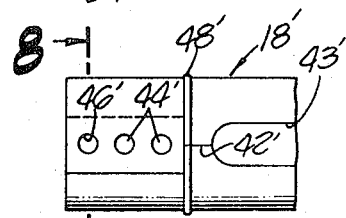

SEALING GROMMET AND PLUG FOR USE WITH ELECTRICAL CABLING

This application is a division of our copending application for U.S. Letters Pat. Ser. No. 263,551, filed June 6, 1972.

This invention relates to means for providing a fluid-tight seal about electrical cabling and more particularly to grommet means for soft flexible elastomeric material slit lengthwise of one side to permit assembly thereof from the side of cabling and including radial annular ribs cooperating to seal against the exterior of cabling and against the wall of an opening seating the grommet.

There are now available techniques for providing a high-capacity high-strength electrical splice between a continuous main power distribution cable and a branchout cable utilizing a deformable clamping member clenchably interconnecting the two cables without need for doing more than removing a length of insulation from each. Not infrequently such branchouts are made in multiple. This practice presents problems as respects the enclosure of the splice connection and the adjacent portions of the cable sheath with a suitable reliable weather-tight protective housing. Desirably the enclosure should be readily assembled about the cabling using a minimum number of parts.

These needs are satisfied by the present invention in a highly satisfactory manner using a minimum number of tubular elastomeric components each split longitudinally of one side to permit the tubular members to be expanded sufficiently for assembly to the cabling from one side thereof after completion of the splice connection. These components include a resilient relatively stiff main body, a sleeve valve of the same material snugly embracing the mid portion of the main body, and several grommets of soft flexible elastomeric material embracing the cabling to either side of the splice connection and cooperating to close the opposite ends of the main body. Some of these grommets include adapter sleeves seated in passages of the main grommet and serving to provide a snug seal between this passage and smaller size branchout cables. The rotary valve overlies a charging opening for potting compound filling the interior of the assembled splice housing. After the housing has been charged, the valve is rotated to seal the charging opening. The main housing includes portions along its slit edges designed to interlock with one another to hold the slit edges closed and snugly embracing the closure grommets at its opposite ends until the potting compound takes a set. Thereafter, the potting compound forms a strong bond with surfaces in contact therewith and supplements the locking tangs in holding the main body assembled. Desirably, the grommets include flexible annular ribs assuring sealing contact with juxtaposed surfaces of the cabling and of the housing parts. If one of the cable outlets is not required to seat a cable, a closure plug is inserted and sealed in place by contact with the potting compound. All components required to complete a splice housing assembly, including a settable potting compound, are preferably packaged for shipment and protection against loss of components until ready for use in the field.

Accordingly it is a primary object of this invention to provide grommet means of soft flexible elastomeric material readily assembled over cabling from the side thereof and including multiple flexible sealing ribs having an interference fit with the exterior of cabling to compensate for tolerance variations and irregularities in the exterior thereof and providing a fluid-tight sealing fit therewith.

Another object of the invention is the provision of a cable sealing grommet assembly comprising a plurality of internesting components including a plug and one or more concentrically arranged tubular members of soft elastomeric material slit lengthwise of one side and each having an I.D. sized to provide a sealing fit about a different size cable.

Another object is the provision of sealing grommet assembly for one end of a cable splice housing comprising an elongated member of soft elastomeric material having one or more tubular passages therethrough each slit along one side and having flexible radial ribs adapted to have an interference sealing contact with the surface of cabling or other object in contact therewith.

Another object of the invention is the provision of soft resilent tubular grommets slit along one side of tubular cable seating passages formed therein and including annular ribs projecting from the walls of said passages and from the exterior of the grommet periphery for sealing engagement with cabling and with the splice housing.

These and other more specific objects will appear upon reading the following specification and claims and upon considering in connection therewith the attached drawing to which they relate.

Referring now to the drawing in which a preferred embodiment of the invention is illustrated:

FIG. 1 is a longitudinal view of a preferred embodiment of the invention assembled to cabling and showing the charging valve in open position;

FIG. 2 is a longitudinal sectional view on an enlarged scale taken along line 2—2 on FIG. 1;

FIG. 3 is a cross sectional view on line 3—3 of FIG. 2 but showing the charging valve rotated to closed position;

FIG. 4 is a cross sectional view of one of the grommet units showing one passage closed by an adapter grommet and a cooperating plug and the other cable passage empty;

FIG. 5 is a cross sectional view taken along line 5—5 on FIG. 4;

FIG. 6 is a perspective view of the kit of splice housing components typically employed to complete a splice between a main cable and a branchout cable;

FIG. 7 is a fragmentary view of one end of an alternate splice housing construction; and FIG. 8 is a cross sectional view on an enlarged scale taken along line 8—8 on FIG. 7.

Referring initially more particularly to FIGS. 1–6 there is shown an illustrative embodiment of the invention cable splice housing, designated generally 10, the components of which are shown packaged as a kit in a plastic envelope 11. The kit components include a sealed package 12 enclosing a package of polymerizable potting compound, a ductile metal splice connector 13, and all components of the splice housing assembly per se 14. These various components are sealed within the plastic package 11 for protection against loss or exposure to the elements or contaminans prior to use.

It will be understood that the sealed envelope 12 preferably contains the two principal ingredients of the potting compound in liquid form sealed in an envelope and held separated from one another therein in any well known manner, as by a removable spring clip in accordance with a technique well known in this art and shown in greater detail in our U.S. Pat. No. 3,523,607, granted Aug. 11, 1970. In accordance with customary practice, the spring clip is removed immediately prior to use of the compounds, thereby permitting the ingredients to be thoroughly intermixed before being charged into the splice housing where the compound polymerizes into a solid mass adhering strongly to surfaces in contact therewith.

All components of the splice housing 14 are generally tubular and each includes at least one longitudinal slit through the wall thereof thereby permitting the edges of the slit to be spread apart sufficiently for lateral assembly over cabling.

As here shown by way of example, the cabling comprises a continuous power distribution cable 15 and a branchout power cable 16 rigidly and inseparably spliced together between the exposed conductors of each by the ductile metal connector 13. This connector has laterally opening channels along either lateral edge for receiving bared cable conductors following which the connector is placed between the jaws of a heavy duty clenching device operating to compress the connector into high pressure conforming contact with the conductors. In so doing, substantial areas of the connector are upset and deformed as the lateral edges are pressed against one another to completely encircle the conductors of each cable.

Housing assembly 14 includes a tubular main body shell 18, a valve sleeve 19, a pair of tubular grommets 20,20, a plurality of adapter grommets 22, and a plurality of plugs 23 sized to have a snug frictional fit within the interior of the adapter grommets 22. The latter fit frictionally within either of the two cylindrical passages 24,25 (FIG. 3) of grommets 20.

The main grommets 20 have a thick walled tubular body 26 integral with a pair of similar thick tubular walls 28,29 forming the walls of the cylindrical passages 24,25. Each of the passages 24,25 is adapted to seat a cable or, alternatively, one of the adapter grommets 22 when it is desired to accommodate a smaller diameter branchout cable, such as cable 16.

The sidewalls of main grommets 20 and of adapter grommets 22 are slit lengthwise of one side thereof permitting the edges of the slit to be expanded and opened away from one another sufficiently to permit insertion of the cable laterally into the interior of the cable seating passage. Thus, grommet 20 is slit along the diametrically opposed sides thereof as indicated at 30,30 to provide access into the cable seating passages 24,25. Likewise, adapter grommets 22 (FIGS. 2 and 3) are provided with a similar slit 32 permitting the adapters to be spread and assembled about a smaller diameter cable 16.

Another feature of the main grommets 20 is the provision of at least one and preferably a plurality of annular flexible ribs 34 encircling the exterior of the grommets as well as similar flexible ribs 35 projecting inwardly from the sidewalls of the cable seating passages 24,25. These flexible resilient ribs accommodate tolerance variations in the dimensions of the parts and assure a fluid tight seal between the grommet, the interior sidewalls of tubular shell 18 and the exterior of cabling 14, or the exterior of adapter grommets 22.

It is also pointed out by reference to FIGS. 3, 4 and 5 that the walls of main grommet 20 are of similar thickness throughout and that the tubular walls of the main body as well as that forming passages 24,25 are preferably interconnected interiorly of the grommet by a transverse partition 36. Actually, this partition comprises a pair of similar sector-shaped walls having the configuration best shown in FIG. 3 and there shown as positioned midway between the opposite ends of the grommet. These partitions seal off the interior of the splice housing from the atmosphere and reinforce and support the tubular walls 28,29 encircling the spliced cables.

The outer ends of adapter grommets 22 have a flanged end 39 and likewise plug 23 has a flanged end 40 (FIG. 4) designed to abut flange 39 when assembled as shown in FIG. 4. If the passageway is occupied by a cable, plug 23 as well as the adapter grommet 22 may be discarded if not needed.

The main body shell 18 may be molded from any suitable rigid resilient elastomeric material, such as a high durometer plastic and one sidewall is slit from end to end as indicated at 42 in FIG. 1. A potting compound charging opening 43 is formed through the sidewall and conveniently intermediate the opposite ends of slit 42. This slit permits the housing shell to be expanded sufficiently to receive the main cable and branch cable. Upon releasing this spreading pressure, the housing quickly closes and is locked closed by the locking tangs, such as the tangs 44,45 shown in FIG. 1. That is, which mate with complementally shaped cutouts 46,47 in the other edge of the slit. The interlocking engagement or disengagement is accomplished simply by depressing one side of the shell more than the other until the tangs 44,45 are in registry with the cutouts 46,47. The presence of the grommet assemblies interiorly of the opposite ends of shell 18 do not interfere with the locking or unlocking of shell 18 owing to the resilience of the grommets and their compressibility.

Surrounding the central portion of the main body shell 18 and held captive between the annular keeper flanges 48,48 is a tubular sleeve valve 19 formed of the same material as the main body shell. The valve is slit to provide a wide opening 50 throughout its length and out-turned opposite edges 51,51 (FIG. 3) cooperate to provide a funnel or hopper facilitating charging the interior of the splice casing with potting compound when the valve opening is aligned with charging opening 43. Thereafter the valve is readily rotatable so that its opening 50 is misaligned with charging opening 43.

Referring to FIGS. 7 and 8, a modified splice housing or shell 18' is shown which differs from that shown in FIGS. 1–6 only as respects the means for holding the shell slit locked closed, the same or similar parts described above being designated by the same reference characters but distinguished by the addition of a prime.

The end portions of shell 18' outwardly of the valve assembly flange 48' are tapered, as is best shown in FIG. 8, and overlap one another in areas at the opposite ends of slit 42'. One of the tapered edges is provided with several locking bosses or tangs 44' seating in cutouts 46' formed through the other tapered edge of the slit. The overlapped edges are unlocked by depressing one edge relative to the other until the tangs are released from cutouts 46' whereupon the shell can be expanded or spread sufficiently to receive the spliced cabling.

In use, a section of the main distribution cable 15 has its sheath removed to expose the conductors and the same is true of one end of the branchout cable 16. Thereupon the ductile connector 13 is assembled over the exposed conductors of the cables, as described above, and clenched into its assembled position. The main grommets 20,20 are then assembled over cables 15,16 to either side of connector 13 by spreading the edges of the slits 30 for one of the passages 25 of each grommet. One of the adapter grommet sleeves 32 is then assembled over cable 16 at a point to the right of the splice housing, as viewed in FIG. 2, and cable 16 assembled into passage 24 of grommet 20. Thereafter, grommet 22 is slid axially along cable 16 until it is properly seated within passage 24. The interior of grommet 22 has a snug fit with the cable and its exterior is in wiping contact with the sealing ribs 35.

Grommets 20,22 having been assembled, they are shifted as necessary along the cabling so that their remote ends are spaced apart by the length of the tubular shell 18 of the splice housing.

The next operation is to spread the opposite edge portions of slit 42 in shell 18 apart by inserting the fingers against the opposite longitudinal edges of the charging opening 43 for potting compound. While so spread the shell is inserted laterally over the cable splice and over both of grommets 20,20 and its opposite ends are manipulated to interlock locking tangs 44 with cutouts 46. Valve sleeve 19 is then assembled laterally over the cabling to one end of the splice assembly and held expanded sufficiently for endwise telescopic assembly over the retainer flanges 48 for the valve sleeve. As soon as the valve is centralized between flanges 48, it is released and snugly grips the underlying portion of shell 18.

The splice assembly is now in readiness to be charged with potting compound. Package 12 is opened, the spring clip or other means on the potting compound package therewithin is removed so that the two principal ingredients can be intermixed. Valve 19 is rotated until the flanges 51,51 are registered with the opposite edges of the charging opening 43. The compound is then poured into the opening as air within the splice housing escapes. As soon as the operator is certain that all portions of the interior are properly charged to a level flush with the charging opening, he rotates the valve to close opening 43 and allows the compound to take a firm set. Owing to the strong adhesive characteristics of the compound he bonds all parts together into an interior assembly and hermetically seals the splice against the entry of moisture.

While the particular sealing grommet and plug for use with electrical cabling herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

We claim:

1. A one-piece molded sealing grommet of flexible elastomeric material comprising a relatively large diameter first tube embracing a plurality of smaller tubes arranged side by side, a plurality of annular flexible ribs projecting radially from the exterior of said first tube, thin-walled transverse partition web means sealing the space between the interior of said first tube and the exterior of said smaller tubes, said partition web means restricted to a minor portion of the axial length of said grommet, and flexible annular rib means projecting radially from at least one of said tubes and adapted to have a snug interference fit with a juxtaposed surface in the installed operating environment of said grommet.

2. A sealing grommet as defined in claim 1 including detachable plug means for at least one of said smaller tubes comprising a cylindrical plug means sized to have a snug sealing fit in one of said smaller tubes when not needed to accommodate cabling.

3. A grommet as defined in claim 2 characterized in that said plug means includes a central cylindrical plug embraced by a sleeve of soft flexible material having an interference fit with the interior sidewall of said one smaller tube and adapted to snugly fit about similarly sized cabling when said central plug is removed.

4. A grommet as defined in claim 1 characterized in the provision of separate slits through juxtaposed wall portions of said first tube and said smaller tubes.

5. A cable sealing grommet for use about a cable at its point of entry into a housing, said grommet having a tubular main body of soft resilient elastomeric material surrounding and having portions of its wall merging with an adjacent longitudinal wall portion of a plurality of tubular sleeves in side by side relation, thin flexible web means integral with said main body and with the exterior of said sleeves between the opposite ends of said sleeves and which has a thickness many times less than the length of said grommet, and a radial slit lengthwise of said main body and of each of said sleeves permitting each of said sleeves to be expanded outwardly to permit a cable to be inserted laterally into said tubular sleeves.

6. A grommet as defined in claim 5 characterized in the provision of flexible annular rib means projecting inwardly from the interior surfaces of said tubular sleeves.

7. A grommet as defined in claim 5 characterized in the provision of flexible annular rib means projecting outwardly from the peripheral surface of said main body.

8. A grommet as defined in claim 5 characterized in the provision of separable radially slit tubular adapter grommets of soft resilient elastomeric material having a snug fluid-tight seal with the interior surfaces of said cable seating passages, and adapter grommet having a central through passage adapted to seat a cable of a diameter substantially smaller than a cable having a sealing fit with the sides of said cable seating passages.

9. A cable sealing grommet for use about cabling at the point of entry of the cabling into a housing, said grommet being molded in one piece from soft resilient elastomeric material and including at least one relatively small diameter inner sleeve means embraced from end to end thereof by an outer large diameter sleeve, said inner sleeve being radially offset from and parallel to the axis of said outer sleeve with the adjacent portions of their sidewalls merging, said merging portion being radially slit lengthwise of said grommet and expandable to permit insertion of cabling laterally into said inner sleeve, and flexible web means extending crosswise of said grommet between the opposite ends thereof sealing the space between said large diameter sleeve and the exterior of said inner sleeve means and having a thickness axially of said grommet which is a minor fraction of the length of said grommet.

10. A cable sealing grommet as defined in claim 9 characterized in the provision of a plurality of grommet elements selectively usable therewith and including at least one tubular sleeve of soft resilient material slit lengthwise thereof and sized to have a snug sealing fit within said first mentioned tubular sleeve, and a cylindrical plug of soft resilient material sized to have a snug sealing fit in one of said tubular sleeves and usable to seal said sleeve in lieu of a cable.

11. A grommet as defined in claim 9 characterized in that there are a plurality of tubular sleeves in side-by-side relation within said outer sleeve and each of which includes a radial slit lengthwise thereof opening outwardly through the adjacent sidewall of said outer sleeve, and said inner sleeve means each including annular flexible ribs projecting inwardly from the inner sidewalls thereof.

12. A grommet as defined in claim 11 characterized in that said outer sleeve includes a plurality of soft annular ribs projecting outwardly from the exterior surface thereof.

13. A grommet as defined in claim 11 characterized in the provision of a longitudinally slit tubular adapter sleeve of soft resilient material sized to have a snug frictional fit within one of said inner sleeve means and installable therein to accommodate a smaller size cable.

* * * * *